(12) United States Patent
Staller et al.

(10) Patent No.: US 6,314,870 B1
(45) Date of Patent: Nov. 13, 2001

(54) CATALYTIC DRIP PAN FOR COOKING DEVICES

(75) Inventors: Tracy D. Staller; Larry E. Campbell, both of Knoxville, TN (US)

(73) Assignee: Advanced Catalyst Systems, LLC, Knoxville, TN (US)

( * ) Notice: Subject to any disclaimer, the term of this patent is extended or adjusted under 35 U.S.C. 154(b) by 0 days.

(21) Appl. No.: 09/609,725

(22) Filed: Jul. 3, 2000

Related U.S. Application Data

(60) Provisional application No. 60/142,567, filed on Jul. 7, 1999.

(51) Int. Cl.[7] .................................................... A47J 36/00
(52) U.S. Cl. .............................. 99/400; 99/446; 428/550; 428/457
(58) Field of Search ........................... 99/400, 425, 446; 126/19 R, 273 R; 428/450, 457, 702, 547, 550; 220/62.11, 62.17, 573.1

(56) References Cited

U.S. PATENT DOCUMENTS

| | | | |
|---|---|---|---|
| 3,993,597 | 11/1976 | Stiles | 252/454 |
| 4,359,039 | 11/1982 | Uchikawa | 126/19 R |
| 4,471,027 | 9/1984 | Maki et al. | 428/450 |
| 4,515,862 | 5/1985 | Maki et al. | 428/450 |
| 4,950,524 | * 8/1990 | Hacker | 99/400 X |
| 5,693,298 | 12/1997 | Bar-Ilan | 423/210 |
| 5,727,451 | 3/1998 | DeMars | 99/386 |

* cited by examiner

*Primary Examiner*—Reginald L. Alexander
(74) *Attorney, Agent, or Firm*—Kenneth H. Johnson

(57) ABSTRACT

A device for improving the efficiency, safety and cleanliness of cooking on a grill wherein the device is placed between the item being cooked and the heat source. Said device being a chamber with dimensions proportional to those of the cooking surface. The chamber is encased by a top surface and a bottom surface. The bottom surface is to be compatible with and coated by an oxidation catalyst, constructed by one or more layers, have structural integrity and constructed so that gases can pass freely through the structure while any liquids or solids falling from above would be interrupted by impingement. The top surface is to be compatible with and coated by an oxidation catalyst and having a structure constructed of one or more layers which would allow substantial flow of liquids and gases. The top and bottom surface forming a chamber with dimensions of separation ranging from 0.1 inches to 6 inches. The top layer to be optimized for collecting and oxidizing the fats and oils to reduce flame but not smoke. The bottom layer to have a higher level of activity in order to more completely destroy any fats or oils which might penetrate the top layer.

26 Claims, 3 Drawing Sheets

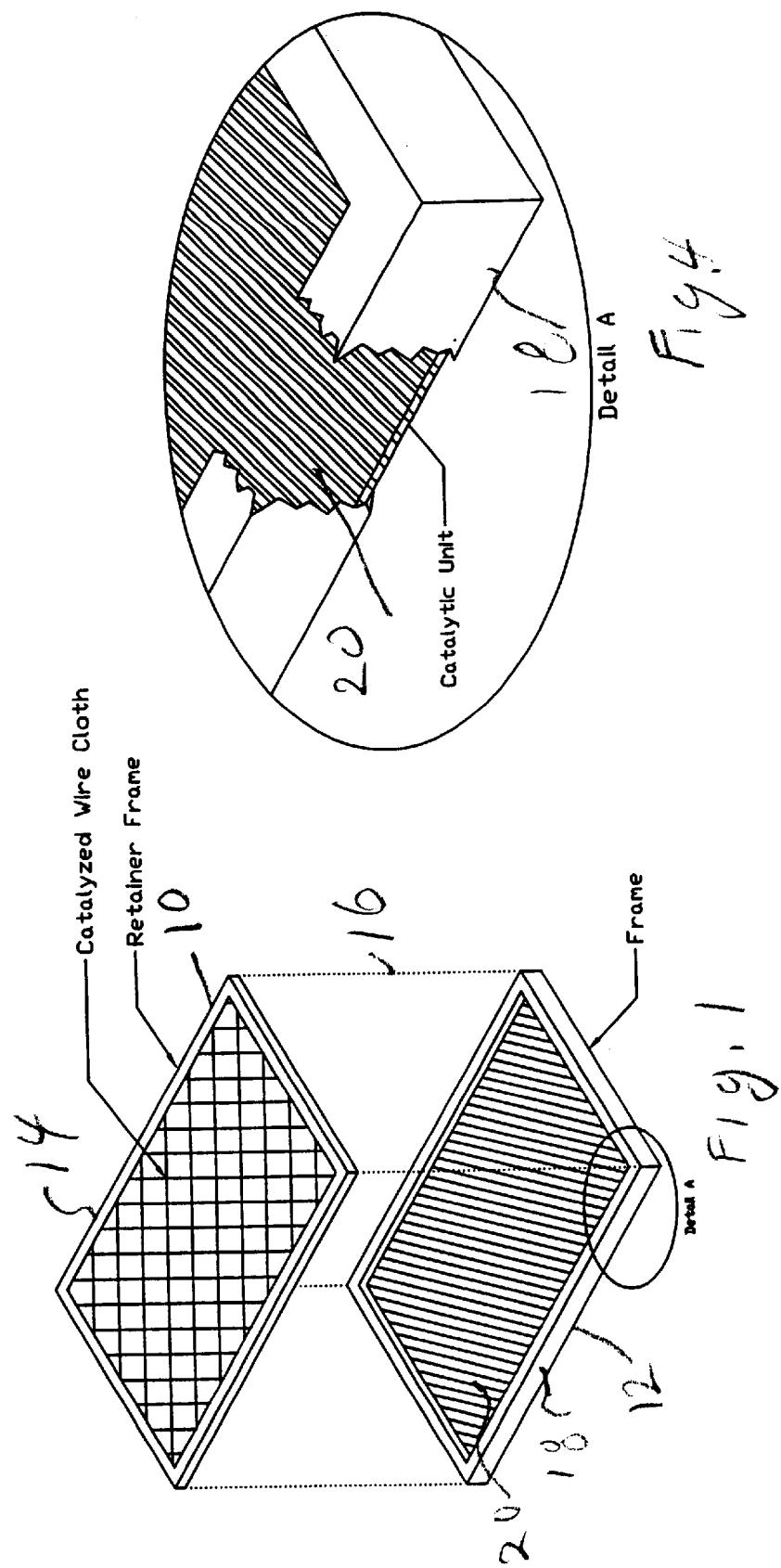

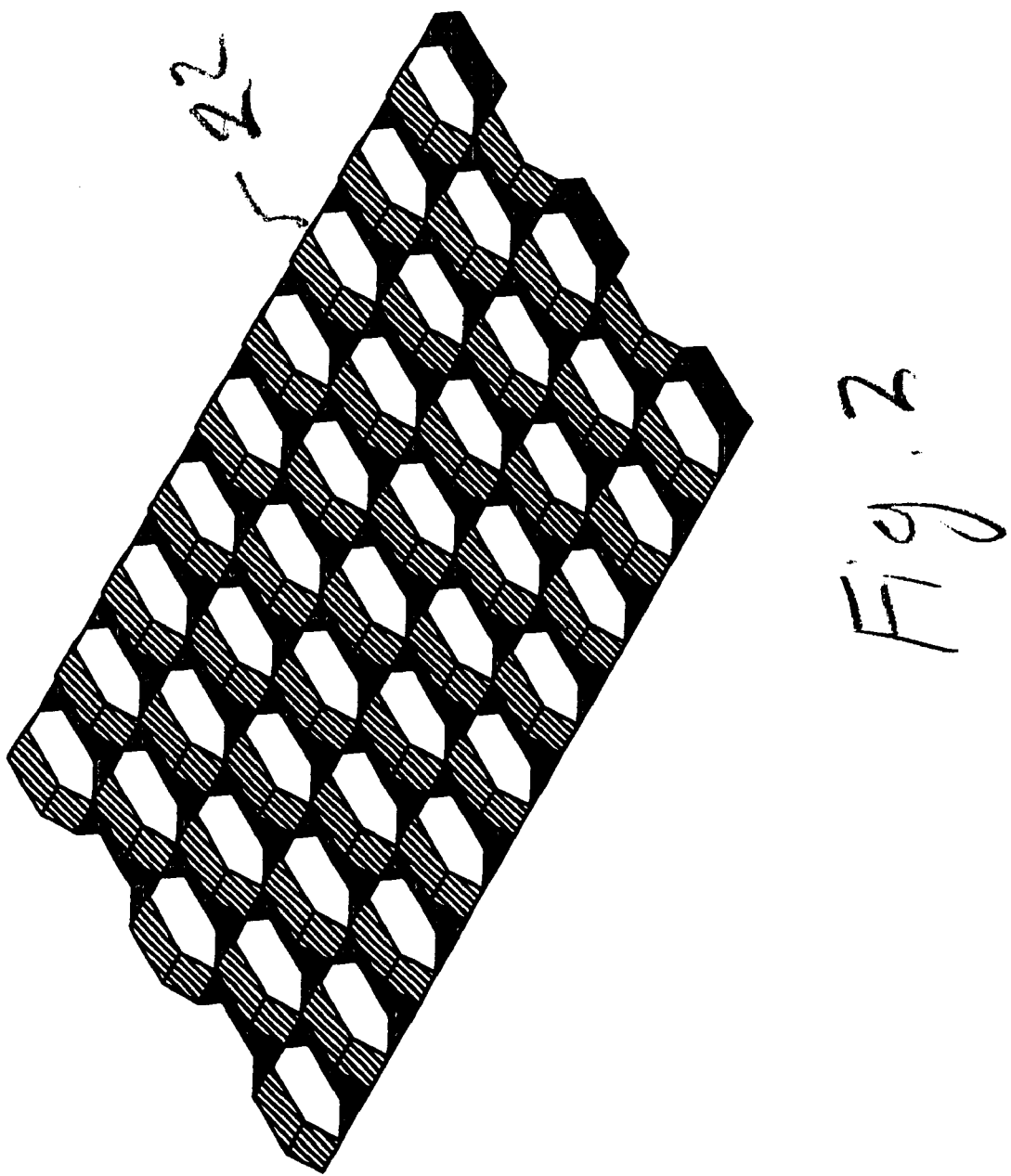

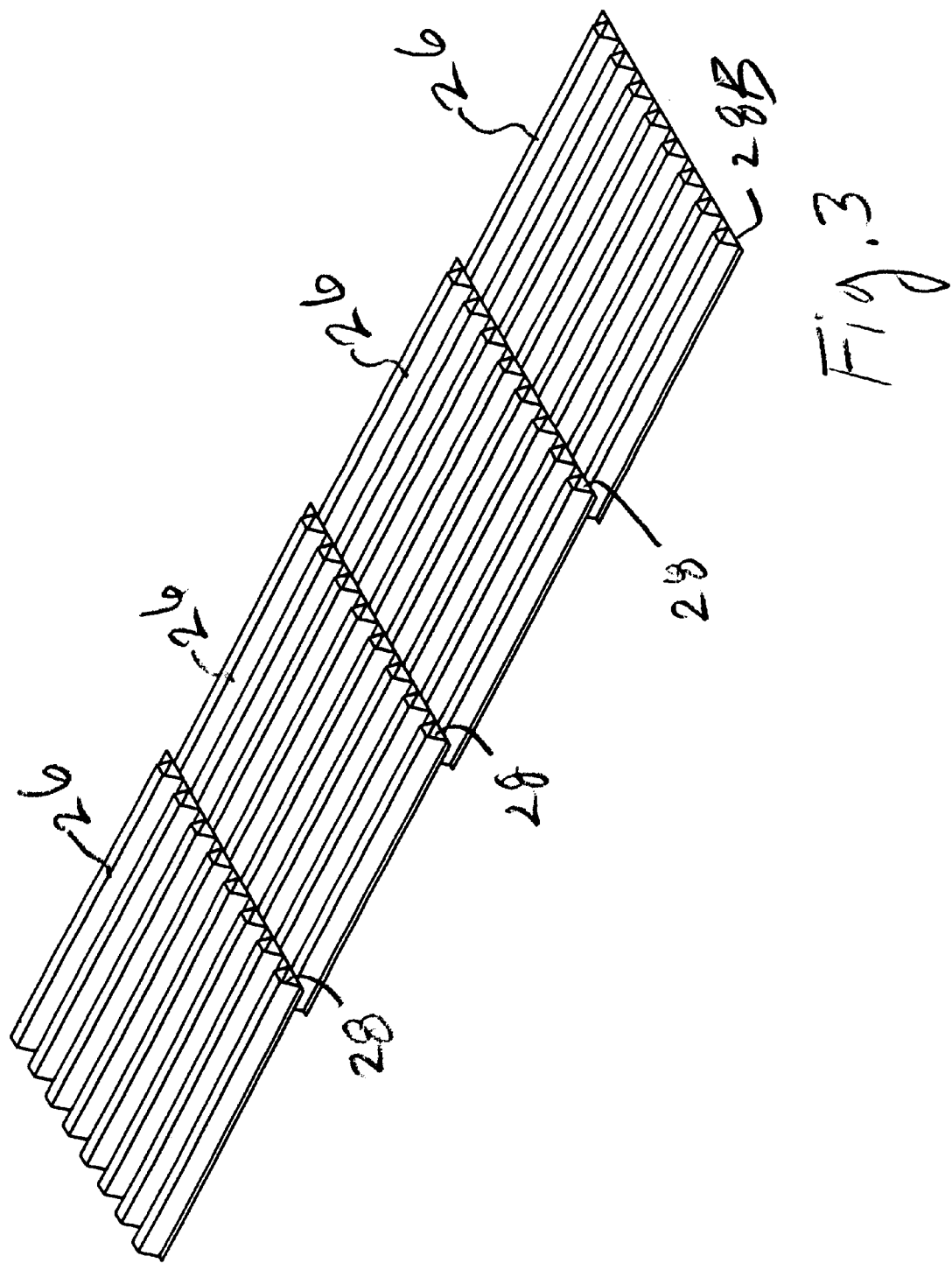

CATALYTIC DRIP PAN FOR COOKING DEVICES

This application claims the benefit of U.S. Provisional Application No. 60/142,567 filed Jul. 7, 1999.

BACKGROUND OF THE INVENTION

1. Field of the invention

The present invention relates to a drip pan comprising catalysts to assist in the cooking process, prevent flames from burning the food being cooked and diminish the deposition of corrosive fat residues on burner assemblies.

2. Related Information

In cooking devices, especially grills, a common problem is that fats and oils that are exuded from the material being cooked, drip onto the burner or hot surfaces where they produce smoke or flames. Where they drip onto cold surfaces they condense to make an eyesore, or worse, they harbor bacteria or fungi. The fats and oils also contain inorganic and organic acids which can cause corrosion on the surface of burner components.

Catalysts have been used for the combustion of the smoke which emanates from the cooking process. These catalysts combust the smoke as it leaves the cooking device. The catalyst is placed in the exhaust and prevents some portion of the organic smoke from polluting the air. These catalysts have no effect on the nature of the cooking process and are strictly afterburners. Other catalysts have been placed in the exhaust of cooking appliances and used to remove fumes produced during high temperature burn-off typical in self-cleaning oven applications.

In gas grills, pumice stones and ceramic blocks have been used between the burners and the food to distribute the heat and to catch the fat drippings. The nature of these products is that they store heat and allow the burner gases to pass through. Due to this nature some of the drippings fall through to the burner assembly while some of the drippings vaporize on the surface of the ceramic producing smoke and flames.

There exists a large number of catalyst formulations for removing food droppings from oven surfaces. However, none were intended to be used between the heat source and food or for the consumption of large amounts of grease or to minimize flame up.

Examples of such formulations are covered under the following patents: U.S. Pat. Nos. 3,993,597; 4,359,039; 4,471,027; and 4,515,862. Others have used catalytic technology to burn the emissions (smoke, VOC's etc.) from broilers and the like (e.g. U.S. Pat. Nos. 5,693,298; and 5,556,819). Two patents cite the use of perforated metal or wire cloth based flame arrestors. U.S. Pat. No. 5,556,819 utilizes a "Filter Screen" to disperse the vaporized fat. This application differs from the present invention in that the main purpose of the screen is to disperse the fat and grease whereas in the present invention the screen serves to actually burn a portion of the fat via catalytic combustion to achieve flame suppression. U.S. Pat. No. 5,727,451 utilizes multiple layers of perforated metal which disperses the fat on its surface to improve vaporization and aid in clean combustion. In addition, the limited open area of the structure minimized flame penetration. In contrast, the present system burns the majority of grease which impinges on the structure and vaporizes a large portion of the fat which is not burned on the surface.

The present invention provides a way to use catalysts to assist in the cooking process, prevent flames from burning the food being cooked and diminish the deposition of corrosive fat residues on burner assemblies. Proper catalyst design in the present invention can use the energy from fat combustion to provide cooking with lower fuel consumption but without flames and still generate smoke for flavoring the food. The elimination of the flame provides a safer cooking experience and prevents the formation of burnt char (which has been suspected in cancer causation) on the food.

SUMMARY OF THE INVENTION

In the present invention, a catalytic unit which is optimized for the burner type (i.e. radiant, convective etc.) is employed to catalytically burn a portion of the fat which reaches it. The catalytic unit may be coupled with a catalyzed wire cloth or perforated metal sheet to suppress fat spattering and flare up. The combination of two elements allows the system to be tuned to meet the goals of each individual application.

Briefly the present invention is a device for improving the efficiency, safety and cleanliness of cooking on a grill wherein the device is placed between the item being cooked and the heat source, said device comprising a chamber with dimensions proportional to those of the cooking surface and encased by a top surface and a bottom surface, said bottom surface being compatible with and coated by an oxidation catalyst, constructed of one or more layers, characterized as having structural integrity and constructed so that gases can pass freely through the structure while any liquids or solids falling from above are impinged, said top surface being compatible with and coated by an oxidation catalyst and having a structure constructed of one or more layers which would allow substantial flow of liquids and gases, said top and bottom surfaces forming a chamber with preferred dimensions of separation ranging from 0.1 inches to 6 inches. Preferably the top layer is optimized for collecting and oxidizing the fats and oils to reduce flame but not smoke and the bottom layer is optimized to have a higher level of activity in order to more completely destroy any fats or oils which might penetrate the top layer.

BRIEF DESCRIPTION OF THE DRAWINGS

FIG. 1 is one embodiment of a physical configuration.

FIG. 2 is a layered structure which has a bottom layer made of a sheet of 0.0125 inch thick 18 SR with 0.188 inch tubular flat straight slits.

FIG. 3 is a structure as in FIG. 2 except the bottom layer was made of alternating pieces of corrugated and flat sheets.

FIG. 4 is a detail of FIG. 1 showing a catalytic unit in a frame.

DETAILED DESCRIPTION

The device consists of two or more layers of catalyzed materials stacked in a horizontal configuration. The bottom layer consists of a structure and a catalyst coating. It must have structural integrity and have a uniform open area such that burner exhaust can flow up through the structure. Ideally, but not necessarily, the bottom layer should be optically opaque. That is to say that if one were to look at the material very little light would pass through the structure but at the same time gases can pass through easily. This type of structure is desirable to collect falling fat liquids. The purpose of the bottom layer is to collect and/or volatilize and/or oxidize the fat liquids falling from the cooking surface. Another function of the bottom layer is to improve the uniformity of heat transfer through redistribution of the hot gas flow.

The upper layers should allow light, liquids and gases to pass through. These layers should also be compatible with the catalytic coating. The top layers should be placed above the bottom layer such that a chamber is created. This chamber will contain fat vapors and hot exhaust gases but is bound on top and bottom by catalyzed surfaces. Another function of the top layer is to oxidize and/or vaporize a portion of the falling fat to produce smoke which adds a good flavor to the food. Yet another function of the top catalyzed surface is to suppress flames which might form in the enclosed chamber and prevent the flames from reaching the cooking food. In a preferred embodiment the bottom surface is comprised of ceramic or metal reticulated foam.

The catalytic coating is preferably comprised of a high surface ceramic oxide coating, an oxygen storage component and a noble (precious) metal or transition metal catalytic component. The high surface area coating has a surface area in the range of 50 to 350 square meters per gram, preferably 100 to 325 square meters per gram and more preferably 200 to 300 square meters per gram. Preferably the high surface area coating is chosen from $Al_2O_3$, $ZrO_2$, $TiO_2$, $SiO2$ or mixtures thereof.

The oxygen storage component is preferably cerium oxide, nickel oxide, manganese oxide, praseodymium oxide or mixtures thereof.

The catalytic component (oxidation catalyst) may be any of those known in the art to oxidize organic compounds to the carbon dioxide and water, such as those disclosed in U.S. Pat. No. 5,451,558, which is incorporated herein in its entirety and U.S. Pat. No. 6,037,307, which is incorporated herein in its entirety. Suitable oxidation catalysts include the noble metals, e.g., Pt, Pd, Rh, Ru, Ni, Fe, Cu, Mo, Co, Mn and mixtures and combinations thereof. The oxidation catalysts may be prepared in any manner known in the prior art. The noble metals, particularly Pt are preferred. A preferred catalytic component is chosen from the group Pt, Pd, $Co_3O_4$, $Cr_2O_3$ or mixtures thereof.

The bottom surface of the present device can be for example high temperature stainless steel in the form of metal foils comprised of alternating crimped and flat sheets, which may be offset and tilted to allow fats and oils to fall directly on the catalyst surface. Where the bottom surface also comprises a corrugated structure the oils and fats drain down the grooves created by the corrugated channels where the oil draining over the hot catalyst oxidizes before it drips through the structure. It has been found in the present device that it is preferred that the collecting corrugations ranging from 2 to 15 channels per inch and have strip width in the range of from 0.25 to 3 inches. The bottom surface is preferably coated with a catalytic coating comprised of a high surface ceramic oxide coating, an oxygen storage component and a noble metal or transition metal catalytic component.

The bottom surface may be honeycombed ceramic, or expanded (foamed) metal generally known as monoliths. The monolith is preferably a macroporous material having from 64 to 600 cells (pores) per square such (CPS) which is about 25 to 80 pores per linear inch (ppi) although lower pore count materials are suitable.

The bottom surface may also comprise sheet metal which has been tubularly slit.

The metal sheet is preferably oriented with the tubes at an oblique angle to direction which the fat is falling to maximize fat capture and combustion while minimizing the amount of fat which drips through the structure. Preferably the tubularly slit sheet has tube diameters in the range between 0.001" and 0.500".

In the preferred embodiment, the top consists of a perforated metal sheet with holes ranging in diameter from 0.01 inches to 0.125 inches with spacing of 0.02 inches to 0.20 inches on the center with any permissible patterns to achieve open areas from 20% to 70%. The preferred hole size range is from 0.05 inches to 0.125 inches. The preferred pattern is with round holes staggered by 45° to 90°. The top surface is comprised of material which allows the free passage of gases and liquids, but which catches and holds solids. Stainless steel wire cloth is a preferred material, preferably having a mesh in the range from 18 to 325 (Tyler mesh). The top surface is preferably coated with a catalytic coating comprised of a high surface ceramic oxide coating, an oxygen storage component and a noble metal or transition metal catalytic component. The top surface is preferably constructed of high temperature stainless steel wire cloth. The top surface is preferably spaced above the bottom surface at a height sufficient to allow vaporized fats and oils above the catalyst surface to combust in the form of small and contained flames. The catalyzed screen preventing flames and splattering grease from escaping, which is especially desirable when cooking very fatty foods. In a preferred embodiment the top surface is made of woven ceramic cloth.

In a preferred embodiment the bottom surface is composed of two or more perforated layers offset in which the holes or openings of the top sheet are positioned above a non perforated area of the bottom sheet thus presenting the maximum impingement surface.

The catalyst component comprises from 1 to 50 wt %, preferably 3 to 10 wt % of the combination of the catalytic coating. The oxygen storage component comprises from 1 to 30 wt % preferably 5 to 10 wt % of the catalytic coating and the high surface area ceramic oxide component comprises 20 to 95 wt %, preferably 80 to 95 wt % of the catalytic coating. When the oxidation catalytic coating is applied to a surface, it comprises 0.05 to 5 wt %, preferably 0.1 to 0.5 wt % of the combination of the catalytic coating and the surface.

Referring now to FIG. 1, a device according to the present invention is schematically illustrated. The structure separating the top surface 10 from bottom surface 12 is represented by the dotted lines 16. In this embodiment the top surface is composed of a wire cloth coated with the catalytic coating described in Example 1 which is held in frame 14 and spaced away from the bottom surface.

FIG. 4 is an enlarged detail of a section of the bottom surface which is composed of a frame 18 and corrugated sheet 20 coated with the same catalytic coating as the top surface.

FIG. 2 shows an alternative or additional bottom layer which is a sheet (metal) 22 having tubular flat straight slits 24 formed therein. Similarly, FIG. 3 is an alternative bottom surface which is comprised of a plurality of sets of perforated corrugated sheets 26 and flat sheets 28, of which all but the bottom sheet 28B maybe perforated. These sets are placed in the frame 18 in place of or in addition to the structure shown there. All of the components of FIGS. 2 and 3 are preferably coated with the catalytic coating as described above.

The top surface and the bottom surface need not be coated with the same catalytic coating. Moreover, when the whole bottom and/or top surface are comprised of two or more structures, the structures which form the surfaces need not have the same catalytic coating.

EXAMPLE 1

An R. H. Peterson gas grill Deluxe Model was fitted with Corning, Inc. "Hot Blocks" ceramic honeycomb with 200 cells/square inch. The blocks were placed 4 inches under the cooking surface. The grill was preheated for 10 minutes according to the manufactures instructions. Ten bratwurst sausage links were cooked on medium setting. The sausages were cooked for 10 minutes with turning. Large amounts of black and white smoke were formed along with flames that engulfed the sausages. After the cooking, the grill was turned on high for 15 minutes for cleaning. Observations after the cleaning cycle demonstrated that the blocks were black and encrusted with carbonaceous deposits and tarry black fat drippings were coating the bottom of the gas grill under the burners. Smoke was captured during cooking using an ice chilled condenser Cooked and uncooked sausages were extracted using a soxhlet extractor using methylene chloride. The condensed smoke was extracted with acetone. The extract of the smoke and the sausages was analyzed by high pressure liquid chromatography. The results showed the presence of pyrene and benzopyrene, both of which are potentially toxic compounds, in the smoke and the cooked sausages but none in the uncooked sausages.

A taste panel consisting of five people observed that the sausages were crisp (burned) on the outside and had a charred burnt flavor.

EXAMPLE 2

A test was conducted as in Example 1 except that the hot blocks were replaced by a layered structure which has a bottom layer made of a sheet of 0.0125 inch thick 18 SR with 0.188 inch tubular flat straight slits (as shown in FIG. 2). The bottom layer had been oxidized to over 1800° F. to form a passivated layer and then coated with an oxidation catalyst which contained an oxygen storage component. The catalyst was a 4/1 Pd/Pt supported on aluminum oxide which had been pre-coated with cerium oxide oxygen storage component. The top layer was composed of 24 mesh 304 stainless steel screen coated with the same oxidation catalyst. The 304 screen had been heated to over 1800° F. before catalyst coating. The chamber between the top and bottom catalyst layers was approximately one inch. The grill was preheated for 10 minuets according to the manufacturer's instructions. Ten sausages were cooked for ten minutes on medium heat. During cooking no flames were observed. The only smoke observed was white. After cooking a 15 minute cleaning cycle was performed, some loose black carbonaceous deposits on top of a white ash layer were observed.

There was much less fat on the bottom of the grill under the burners and that fat was light and fluid. Smoke was collected and extracted with acetone and a cooked sausage was extracted with methylene chloride as in example 1. For these extracts, analysis by high pressure chromatographic analysis did not detect any trace of pyrene.

The same test panel as in Example 1 observed that the sausages were moist, had a good taste with no hint of char or burnt flavor.

EXAMPLE 3

A test was conducted as in Example 2 except that the bottom layer was made of a sheet of Roll pierced 0.004" thick 18SR placed with the burrs facing the grill surface. The bottom layer had been oxidized at a temperature over 1800° F. to form a passivated layer and then coated with an oxidation catalyst which contained an oxygen storage component. The catalyst was a 4/1 Pd/Pt supported on aluminum oxide which had been pre-coated with cerium oxide oxygen storage component. The top layer was composed of 24 mesh 304 stainless steel screen (0.014" wire diameter) coated with the same oxidation catalyst. The 304 screen had been heated to over 1880° F. before catalyst coating. The chamber between the top and bottom catalyst layers was approximately one inch. The grill was preheated for 10 minutes according to the manufacturer's instructions. Ten sausages were cooked for ten minutes on medium heat. During cooking no flames were observed. The only smoke observed was white. After cooking a 15 minute cleaning cycle was performed and some loose black carbonaceous deposits on top of a white ash layer were observed. The amount and type of fat on the bottom of the grill under the burners was comparable to that in Example 2.

The same test panel as in the previous examples observed that the sausages were moist, had a good taste with no hint of char or burnt flavor and appeared similar to those in Example 2.

EXAMPLE 4

A test was conducted as in Example 2 except that the bottom layer was made of multiple layers of 304 SS wire cloth. The screen structure consisted of three pieces of catalyzed wire cloth laminated in the following order (from bottom to top) 100 mesh (0.0045" wire diameter), 60 mesh (0.0075" wire diameter), 24 mesh (0.014" wire diameter). The individual layers of wire cloth had been heated to over 1 800° F. to form a passivated layer and then coated with an oxidation catalyst which contained an oxygen storage component. The catalyst was a 4/1 Pd/Pt supported on aluminum oxide which had been pre-coated with cerium oxide oxygen storage component. Following coating, the screen layers were placed together and a 32 ga. stainless steel frame was crimped over the edges. The top layer was composed of 24 mesh 304 stainless steel screen (0.014" wire diameter) coated with the same oxidation catalyst. The 304 screen had been heated to over 1880° F. before catalyst coating. The chamber between the top and bottom catalyst layers was approximately one inch. The grill was preheated for 10 minutes according to the manufacturer's instructions. Fifteen quarter pound hamburgers (80% lean) were cooked for ten minutes on medium high heat. During cooking no flames were observed. After cooking a 15 minute cleaning cycle was performed leaving some loose black carbonaceous deposits on top of a white ash.

The same test panel as in the previous examples observed that the hamburgers were moist, had an excellent barbecued flavor with no hint of char of burnt flavor.

EXAMPLE 5

A test was conducted as in Example 4 except that the bottom layer was made of alternating pieces of corrugated and flat sheets (FIG. 3). Two separated assemblies made up the bottom layer. The upper assembly had 4 corrugations per inch while the lower assembly had 6 corrugations per inch. The assemblies had been heated to over 1800° F. to form a passivated layer and then coated with an oxidation catalyst which contained an oxygen storage component. The catalyst was a 4/1 Pd/Pt supported on aluminum oxide which had been pre-coated with cerium oxide oxygen storage component. The top layer was composed of 24 mesh 304 stainless steel screen (0.014" wire diameter) coated with the same oxidation catalyst. The 304 screen had been heated to over 1880° F. before catalyst coating. The chamber between the top and bottom catalyst layers was approximately one inch. The grill was preheated for 10 minutes according to the manufacturers instructions. Fifteen quarter-pound hamburgers (80% lean) were cooked for twenty minutes on medium high heat. During cooking no flames were observed. After cooking a 15-minute cleaning cycle was performed leaving some loose black carbonaceous deposits on top of a white ash. A small amount of fat was noted on the bottom of the grill.

The same test panel as in the previous examples observed that the hamburgers were moist, had a good barbecued flavor with no hint of char or burnt flavor.

EXAMPLE 6

A test was conducted as in Example 4 except that the bottom layer was made of 0.5" thick 304 stainless steel foam having 10 pores per inch. The foam monolith had been heated to over 1800° F. to form a passivated layer and then coated with an oxidation catalyst which contained an oxygen storage component. The catalyst was a 4/1 Pd/Pt supported on aluminum oxide which had been pre-coated with cerium oxide oxygen storage component. The top layer was composed of 24 mesh 304 stainless steel screen (0.014" wire diameter) coated with the same oxidation catalyst. The 304 screen had been heated to over 1880° F. before catalyst coating. The chamber between the top and bottom catalyst layers was approximately one-half inch. The grill was preheated for 10 minutes according to the manufacturer's instructions. Fifteen quarter-pound hamburgers (80% lean) were cooked for twenty minutes on medium high heat. During cooking no flames were observed. After cooking a 15-minute cleaning cycle was performed leaving some loose black carbonaceous deposits on top of a white ash. A small amount of fat was noted on the bottom of the grill.

The same test panel as in the previous examples observed that the hamburgers were moist, had a good barbecued flavor with no hint of char or burnt flavor.

EXAMPLE 7

A test was conducted using the same catalyst configuration as Example 2 except that grill was fitted with a smoke oven and rotisserie unit. The grill was preheated for 10 minutes according to the manufacturer's instructions. A fifteen-pound Butterball turkey was placed on the rotisserie. The heat was reduced to medium low and the smoke oven closed. The turkey was rotisserie cooked for approximately 5 hours (until it reached an internal temperature of 180° F.). During cooking no flames were observed. After cooking a 15 minute cleaning cycle was performed. Some loose black carbonaceous deposits on top of a white ash layer were observed.

The same test panel as in the previous examples observed that the turkey had a smoked flavor with no burnt or charred skin.

By controlling the geometry of the structure and the activity level of the catalyst, a catalytic drip pan results which significantly reduces the amount of fat reaching the burner assemblies and in some applications can prevent fat breakthrough. The catalytic combustion of the grease results in virtual elimination of flare-ups while providing sufficient smoke to desirably flavor the food.

EXAMPLE 8

A BroilMaster™ model D3 gas grill was tested in four modes. A sample of the grill exhaust was extracted using a diaphragm pump drawn through a cooling coil then through a gas chiller. The dry exhaust was analyzed for carbon monoxide, carbon dioxide and oxygen. The carbon monoxide was analyzed using a TECO model 48 non dispersive infrared analyzer. The $CO_2$ and oxygen were analyzed using an Illinois Instrument model 3570. In the first test the grill was tested empty. In the second test the grill used Corning "Hot Blocks." In the third test the grill contained black ceramic briquettes supplied by Martin Industries as part of their recommended media. In the fourth test a 14 inch wide by 24.25 inch long by 1 inch deep chamber was installed. The bottom of the chamber was composed of a 26 gauge (0.0188" thick) 430 stainless steel sheet with 0.188 inch tubular flat straight slits. The sheet had been oxidized at 1800° F. and coated with 27.6 milligrams per square inch of a catalyst coating. The catalyst coating had 160 square meters per gram and contained; 7% $CeO_2$, 2.30% palladium metal 0.59% platinum. The top surface was composed of a 24 mesh 304 stainless steel wire cloth which had been oxidized to 1800° F. and coated with 26.2 milligrams per square inch of the same catalyst composition. Temperature was measured at the grid where the media was supported. The results are shown in Table 1.

TABLE 1

Gaseous Emissions from Grills with Varying Media

| Test # | % $CO_2$ Open/Closed | ppmv CO Open/Closed | % $O_2$ Open/Closed | Media Grid Temp. °F. Open/Closed |
|---|---|---|---|---|
| 1 | 1.9/4.3 | 11.3/28.1 | 18.8/14.8 | N/A |
| 2 | 1.9/4.4 | 8/20 | 18.8/14.7 | 964/1005 |
| 3 | 1.9/4.4 | 5.7/24.7 | 19.9/14.9 | 837/901 |
| 4 | 2.2/4.8 | 0.1/4.9 | 18.6/14.2 | 980/1030 |

The results demonstrate that the catalyzed drip pan gives similar but slightly higher grill temperatures to conventional media but much lower carbon monoxide levels. In these experiments the time to get to 800° F. grid temperature was measured. The results are shown in Table 2.

TABLE 2

Time to Get Grill to Temperature

| Media Tested | Time to get to 800° F. |
|---|---|
| Catalyzed Drip Pan | 3 minutes |
| Corning Hot Blocks | 5 minutes |
| Commercial Bricks | 10 minutes |

These results show that the catalyzed drip pan heats up faster thus saving fuel.

The invention claimed is:

1. A catalytic drip pan for improving the efficiency, safety and cleanliness of cooking on a grill wherein the device is placed between the item being cooked and the heat source, said device comprising a chamber with dimensions proportional to those of the cooking surface and encased by a top surface and a bottom surface, said bottom surface being compatible with and coated by an oxidation catalyst, characterized as constructed of at least one layer and having structural integrity so that gases can pass freely through the structure while any liquids or solids falling from above would be impinged thereon, said top surface being compatible with and coated by an oxidation catalyst and having a structure constructed of at least one layer which would allow substantial flow of liquids and gases.

2. The catalytic drip pan according to claim 1 wherein the catalytic coating is comprises a high surface area ceramic oxide coating, an oxygen storage component and a catalytic component comprising at least one noble metal or transition metal.

3. The catalytic drip pan according to claim 2 wherein at least one of said top surface or said bottom surface material comprises a high temperature stainless steel which has been treated to promote the formation of a corrosion resistant layer and over-coated by said catalytic coating.

4. The catalytic drip pan according to claim 3 wherein said treatment comprises oxidizing.

5. The catalytic drip pan according to claim 3 wherein said treatment comprises coating to promote the formation of a corrosion resistant layer.

6. The catalytic drip pan according to claim 2 wherein at least one of said top or bottom surface comprises a glass composition which is over-coated with said catalyst material.

7. The catalytic drip pan according to claim 2 wherein at least one of said top or bottom surface comprises a metal coated with a ceramic which is over-coated with said catalyst material.

8. The catalytic drip pan according to claim 2 wherein at least one of said top or bottom surface comprises a metal coated with glass ceramic enamel which is over-coated with said catalyst material.

9. The catalytic drip pan according to claim 2 wherein at least one of said top or bottom surface comprises a glass ceramic which is over-coated with said catalyst material.

10. The catalytic drip pan according to claim 1 wherein the bottom structure is created from metal foils with alternating crimped and flat sheets.

11. The catalytic drip pan as in claim 10 wherein the alternating strips are slightly offset and tilted to allow the fat and oils to fall directly on the catalyst surface and then drain down the grooves created by the corrugated channels and where the oil draining over the hot catalyst oxidizes before it drips through the structure.

12. The catalytic drip pan according to claim 10 wherein the corrugated catalyst has collecting corrugations ranging from 2 to 15 channels per inch and strip width of from 0.25 to 3 inches.

13. The catalytic drip pan system according to claim 3 wherein the top surface is constructed of high temperature stainless steel wire cloth.

14. The catalytic drip pan according to claim 13 wherein the wire cloth catalyst ranges from 18 to 325 mesh.

15. The catalytic drip pan according to claim 3 wherein the bottom surface structure is created from metal sheet which has been tubularly slit.

16. The catalytic drip pan according to claim 15 wherein the metal sheet is oriented with the tubes at an oblique angle to direction which the fat is falling to maximize fat capture and combustion while minimizing the amount of fat which drips through the structure.

17. The catalytic drip pan according to claim 16 wherein the tubularly slit sheet has tube diameters between 0.001"and 0.500".

18. The catalytic drip pan according to claim 3 wherein the bottom surface is composed of at least two perforated layers offset in which the holes of the top sheet are positioned above a non perforated area of the bottom sheet thus presenting the maximum impingement surface.

19. The catalytic drip pan according to claim 1 wherein the bottom surface is made of ceramic or metal reticulated foam similar in structure to urethane foam used in air conditioning filters.

20. The catalytic drip pan according to claim 1 in which the top surface is made of ceramic woven cloth.

21. The catalytic drip pan according to claim 1 wherein said top and bottom surfaces form a chamber with dimensions of separation ranging from 0.1 inches to 6 inches.

22. The catalytic drip pan according to claim 1 wherein the top surface is constructed of a metal sheet perforated with holes, said hole diameters being in the range of 0.010 to 0.125 inches and said holes being spaced apart in the range of from 0.02 to 0.20 inches on centers.

23. The catalytic drip pan according to claim 22 wherein said holes provide an open area in the range of 20 to 70 % of said top surface.

24. The catalytic drip pan according to claim 23 wherein said hole diameters are in the range of 0.03 to 0.060 inches.

25. The catalytic drip pan according to claim 24 wherein said holes are spaced apart from 0.05 to 0.125 inches on centers.

26. The catalytic drip pan according to claim 22 wherein said holes are round.

\* \* \* \* \*